(12) United States Patent
Showering

(10) Patent No.: US 9,002,641 B2
(45) Date of Patent: Apr. 7, 2015

(54) NAVIGATION SYSTEM CONFIGURED TO INTEGRATE MOTION SENSING DEVICE INPUTS

(71) Applicant: Hand Held Products, Inc., Fort Mill, SC (US)

(72) Inventor: Paul Edward Showering, Chippenham (GB)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 13/749,827

(22) Filed: Jan. 25, 2013

(65) Prior Publication Data

US 2014/0100774 A1    Apr. 10, 2014

Related U.S. Application Data

(60) Provisional application No. 61/710,214, filed on Oct. 5, 2012.

(51) Int. Cl.
| | |
|---|---|
| *G01S 13/00* | (2006.01) |
| *G01S 7/00* | (2006.01) |
| *G01S 5/02* | (2010.01) |
| *G01C 21/00* | (2006.01) |
| *G01C 21/16* | (2006.01) |
| *G01S 19/50* | (2010.01) |

(52) U.S. Cl.
CPC .............. *G01C 21/00* (2013.01); *G01C 21/165* (2013.01); *G01S 5/02* (2013.01); *G01S 19/50* (2013.01)

(58) Field of Classification Search
USPC ........................................................ 701/469
See application file for complete search history.

(56) References Cited

U.S. PATENT DOCUMENTS

| | | | |
|---|---|---|---|
| 4,903,212 A | 2/1990 | Yokouchi et al. | |
| 5,225,842 A | 7/1993 | Brown et al. | |
| 5,781,150 A | 7/1998 | Norris | |
| 5,862,511 A | 1/1999 | Croyle et al. | |
| 6,029,111 A | 2/2000 | Croyle | |

(Continued)

FOREIGN PATENT DOCUMENTS

| | | |
|---|---|---|
| CN | 102023305 A | 8/2010 |
| EP | 1399757 A2 | 3/2004 |

(Continued)

OTHER PUBLICATIONS

Search Report for GB Application No. 1317237.4 [Published as GB2508486 (Jun. 4, 2014)] (Counterpart to Current Application); Dated Mar. 26, 2014; 8 pages.

*Primary Examiner* — Thomas G Black
*Assistant Examiner* — Tyler Paige
(74) *Attorney, Agent, or Firm* — Additon, Higgins, & Pendleton, P.A.

(57) ABSTRACT

A navigation system can comprise a microprocessor, a memory, a navigational signal receiver configured to receive a radio signal from at least one external system, a motion sensing device, and a navigation program executable by the microprocessor. The navigational signal receiver can be communicatively coupled to the microprocessor via a communication port. The navigation program can be configured to receive messages from the navigational signal receiver by communicating to the driver of the communication port. The communication port driver can adjust the current position based on the data returned by the motion sensing device.

19 Claims, 4 Drawing Sheets

(56) References Cited

U.S. PATENT DOCUMENTS

| | | | |
|---|---|---|---|
| 6,308,134 B1 | 10/2001 | Croyle et al. | |
| 6,721,657 B2 | 4/2004 | Ford et al. | |
| 6,735,523 B1 | 5/2004 | Lin et al. | |
| 6,845,304 B1 | 1/2005 | Young | |
| 6,862,525 B1 | 3/2005 | Beason et al. | |
| 6,883,747 B2 | 4/2005 | Ratkovic et al. | |
| 6,992,584 B2 | 1/2006 | Dooley et al. | |
| 7,468,692 B1 * | 12/2008 | Wiegers | 342/357.51 |
| 7,630,707 B2 * | 12/2009 | Lee et al. | 455/421 |
| 7,848,765 B2 * | 12/2010 | Phillips et al. | 455/456.3 |
| 8,326,315 B2 * | 12/2012 | Phillips et al. | 455/456.1 |
| 8,395,496 B2 * | 3/2013 | Joshi et al. | 340/539.1 |
| 2002/0022924 A1 | 2/2002 | Begin | |
| 2003/0008671 A1 | 1/2003 | Lundgren et al. | |
| 2003/0109988 A1 | 6/2003 | Geissler et al. | |
| 2003/0179133 A1 | 9/2003 | Pepin et al. | |
| 2004/0236475 A1 * | 11/2004 | Chowdhary | 701/1 |
| 2007/0032950 A1 | 2/2007 | O'Flanagan et al. | |
| 2007/0156337 A1 | 7/2007 | Yanni | |
| 2007/0260398 A1 | 11/2007 | Stelpstra | |
| 2008/0318626 A1 | 12/2008 | Rofougaran | |
| 2009/0234582 A1 * | 9/2009 | Figueroa | 701/216 |
| 2010/0127926 A1 | 5/2010 | Wang | |
| 2010/0164787 A1 | 7/2010 | Khosravy et al. | |
| 2010/0211315 A1 | 8/2010 | Toda | |
| 2011/0191024 A1 | 8/2011 | DeLuca | |
| 2011/0208424 A1 | 8/2011 | Hirsch et al. | |
| 2011/0238307 A1 * | 9/2011 | Psiaki et al. | 701/213 |
| 2012/0129553 A1 * | 5/2012 | Phillips et al. | 455/456.3 |
| 2012/0129606 A1 | 5/2012 | Rofougaran et al. | |
| 2012/0202485 A1 * | 8/2012 | Mirbaha et al. | 455/426.1 |
| 2012/0221188 A1 * | 8/2012 | Kelly, III | 701/29.1 |

FOREIGN PATENT DOCUMENTS

| | | |
|---|---|---|
| EP | 1488197 A1 | 12/2004 |
| GB | 2508486 A | 6/2014 |
| JP | H05010774 A | 1/1993 |
| JP | H07286853 A | 10/1995 |
| WO | 02099453 A2 | 12/2002 |
| WO | 03078929 A1 | 9/2003 |

* cited by examiner

NAVIGATION SYSTEM CONFIGURED TO INTEGRATE MOTION SENSING DEVICE INPUTS

CROSS REFERENCE TO RELATED APPLICATIONS

This application claims priority to U.S. Provisional Application No. 61/710,214 filed Oct. 5, 2012 entitled, "Navigation System Configured to Integrate Motion Sensing Device Inputs." The above application is incorporated herein by reference in its entirety.

FIELD OF THE INVENTION

This invention relates generally to navigation systems, and, more specifically, to navigation systems based on mobile computing devices equipped with navigational signal receivers.

BACKGROUND OF THE INVENTION

Mobile computing devices equipped with navigation signals receivers, such as satellite-based navigational system receivers (e.g., GPS receivers) are widely used for vehicle navigation.

SUMMARY OF THE INVENTION

In one embodiment, there is provided a navigation system comprising a microprocessor, a memory, a navigational signal receiver configured to receive a radio signal from at least one external system, a motion sensing device, and a navigation program executable by the microprocessor. The navigational signal receiver can be communicatively coupled to the microprocessor via a communication port. The navigation program can be configured to receive messages from the navigational signal receiver by communicating to the driver of the communication port. The communication port driver can be configured to operate in a first operating mode and a second operating mode. The communication port driver operating in the first operating mode can be configured, responsive to receiving from the navigational signal receiver a message comprising valid geographic coordinates, to store a current spatial position in the memory and forward the message to the navigation program. The communication port driver operating in either the first operating mode or the second operating mode can be configured to adjust, based on motion data received from the motion sensing device, the current spatial position stored in the memory. The communication port driver operating in the first operating mode can be configured, responsive to receiving from the navigational signal receiver a message indicating a failed attempt to obtain valid geographic coordinates, to switch to the second operating mode. The communication port driver operating in the second operating mode can be configured to transmit to the navigation program a message comprising geographic coordinates calculated based on the current spatial position stored in the memory. The messages transmitted by the communication port driver to the navigation program can comply to a pre-defined navigation message standard.

In some embodiments, the external system can be provided by a satellite-based navigation system. In a further aspect, the satellite-based navigation system can be selected from the group consisting of: Global Positioning System (GPS), Global Navigation Satellite System (GLONASS).

In some embodiments, the system can be provided by a mobile computing device. Alternatively, the system can be provided by a mobile computing device communicatively coupled to an external motion sensing device. In a further aspect, the mobile computing device can be provided by smart phone or a portable computer.

In some embodiments, the external motion sensing device can be communicatively coupled to the mobile computing device via a wired communication interface or a wireless communication interface.

In some embodiments, the motion sensing device can be provided by at least three accelerometers configured to measure proper acceleration values along at least three mutually-perpendicular axes. Alternatively, the motion sensing device can be provided by a 9-DOF (degree of freedom) motion sensing unit containing a 3-axis accelerometer, a 3-axis magnetometer, and 3-axis gyroscope sensors. In some embodiments, the motion sensing device can be provided by a speedometer.

In some embodiments, the communication port can be provided by a serial communication port or a parallel communication port.

In some embodiments, the navigation message standard can be provided by NMEA 0183 standard.

In some embodiments, the communication port driver can be configured to transmit the first message and the third message responsive to receiving a request from the navigation program.

In some embodiments, the communication port driver can be configured to calibrate the motion sensing device based on the valid geographic coordinates received from the navigational signal receiver.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
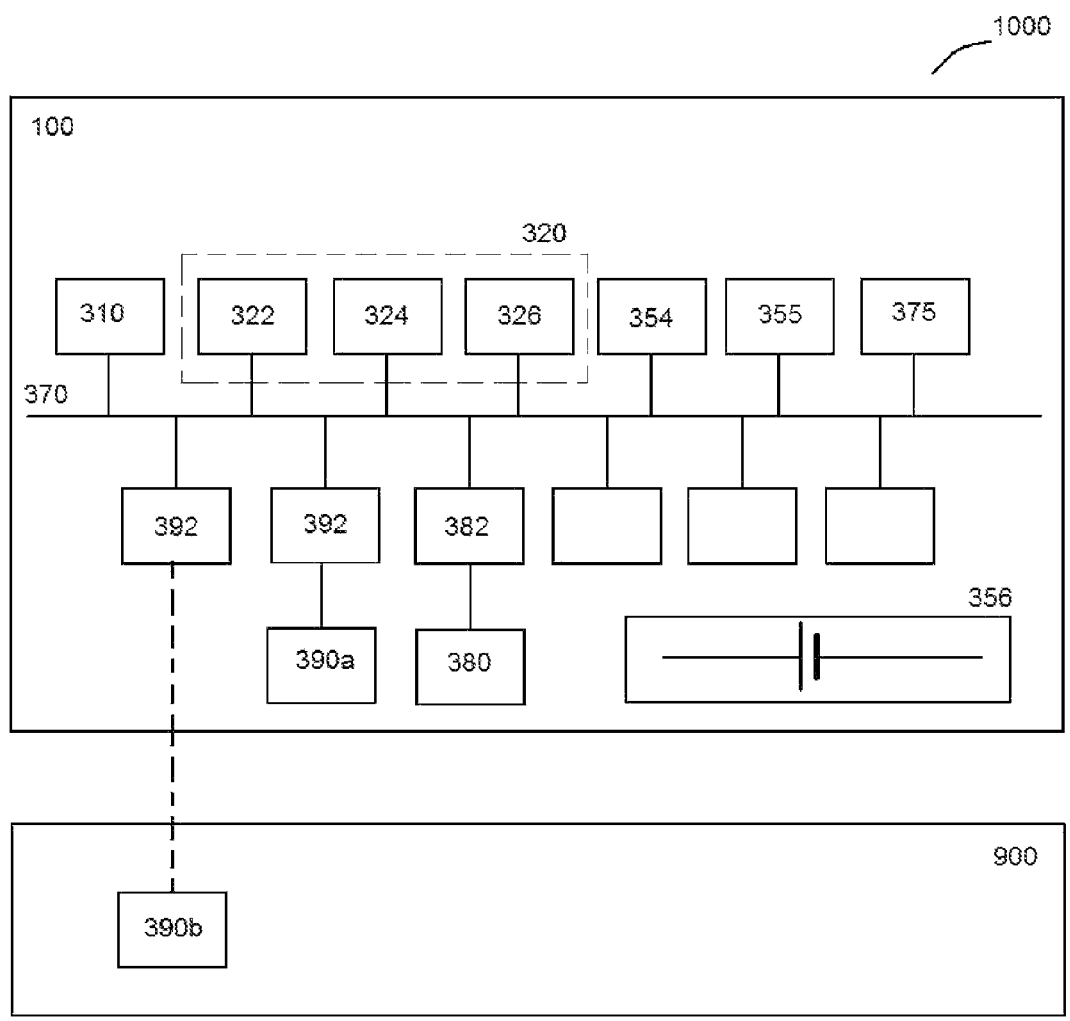
FIG. 1 depicts a component diagram of one illustrative embodiment of a navigation system described herein.

Although devices equipped with navigational signal receivers can under normal circumstances adequately perform vehicle navigation tasks, additional sources of navigational information can be required if the navigational signal is lost, for example, in tunnels, underpasses, in the vicinity of high-rise buildings, etc.

A specialized navigation device or a mobile computing device equipped with a navigational signal receiver can incorporate at least one motion sensing device, such as a speedometer and/or an accelerometer, which can be used for calculating the spatial position and orientation of the device relative to a known point of origin. Conversely, navigation software programs executable by an on-board navigation system or by a mobile computing device can be designed to only read navigational signal receiver inputs.

Navigational signal herein shall refer to a navigational signal received from an external system, including, but not limited to a satellite-based navigation system (such as GPS or GLONASS) or Navigation via Signals of Opportunity (NAVSOP) system.

A "mobile computing device" herein shall refer to a portable programmable device for data processing, including a central processing unit (CPU), a memory, and at least one communication interface. A mobile computing device can be provided, e.g., by a personal digital assistant (PDA), a portable data terminal (PDT), or a smart phone.

A mobile computing device can run a navigation program agnostic of any motion sensing devices (such as speedometers and/or accelerometers) which can be incorporated in the mobile computing device or installed on-board of the vehicle and accessible by the mobile computing device via a wired or wireless interface.

To enable such a navigation program to take advantage of available motion sensing devices without modifying the program code, a specialized communication port driver can be installed on the mobile computing device to support communications of the navigation software program with the communication port to which the navigational signal receiver is connected. A "driver" herein shall refer to a computer program allowing other computer programs to interact with a physical device such as a communication port.

The specialized communication port driver can combine the outputs of a navigational signal receiver and at least one motion sensing device (such as a speedometer or an accelerometer). Upon receiving from the navigational signal receiver a message containing valid geographic coordinates (e.g., a NMEA 0183-compliant message), the communication port driver can transmit the unmodified message to the navigation program. If, however, a message indicating a failed attempt to obtain valid geographic coordinates (e.g., due to loss of the position fix) has been received by the communication port driver, a simulated message (e.g., a NMEA 0183-compliant message) containing geographic coordinates calculated based on the information received from the available motion sensing devices can be transmitted by the driver to the navigation program. A more detailed description of the operation of the communication port driver can be found herein infra.

FIG. 1 depicts a component diagram of one illustrative embodiment of a navigation system described herein. The system 1000 can comprise a mobile computing device 100 including a microprocessor 310 and a memory 320, both coupled to a system bus 370. In some embodiments, the mobile computing device 100 can further comprise a single microprocessor which can be referred to as a central processing unit (CPU). Alternatively, the mobile computing device 100 can comprise two or more microprocessors, for example a CPU and a specialized microprocessor (e.g., an ASIC). In some embodiments, memory 320 can include RAM 322, a nonvolatile memory such as EPROM 324, and a storage memory device 326 such as may be provided by a flash memory or a hard drive memory.

The mobile computing device 100 can further comprise a keyboard interface 354 and a display adapter 355, both also coupled to system bus 370. The mobile computing device 100 can further comprise a battery 356. In some embodiments, the mobile computing device 100 can further comprise at least one connector 375 configured to receive a subscriber identity module (SIM) card.

The mobile computing device 100 can further comprise a navigational signal receiver 380 which can be communicatively coupled to the system bus 370 via a communication port 382. In some embodiments, navigational signal receiver 380 can be provided by a radio signal receiver configured to receive radio signals originated by satellite-based radio transmitters (such as GPS or GLONASS). Alternatively, navigational signal receiver 380 can be provided by a radio signal receiver configured to receive NAVSOP signals. A skilled artisan would appreciate the fact that other types of navigational signal receivers are within the scope of this disclosure.

In a further aspect, navigational signal receiver 380 can be configured to calculate geographic coordinates based on the navigational signals received (e.g., based on GPS, GLONASS, or NAVSOP signals).

In a further aspect, the navigational signal receiver 380 can be configured to transmit messages compliant with a pre-defined navigation message standard, such as NMEA 0183 standard.

In some embodiments, the mobile computing device 100 can further comprise one or more motion sensing devices 390a-390b which can be communicatively coupled to the system bus via one or more communication ports 392.

In a further aspect, each of the communication ports 382 and/or 392 can be provided by a serial communication port (e.g., an RS/232-compliant communication port, an RS/485-compliant communication port, or a USB communication port). Alternatively, each of the communication ports 382 and/or 392 can be provided by a parallel communication port. A skilled artisan would appreciate the fact that other implementations of communication ports 382 and/or 392 are within the scope of this disclosure.

In some embodiments, at least one of the motion sensing devices 390a-390b can be provided by at least three accelerometers configured to measure proper acceleration values along at least three mutually-perpendicular axes. In some embodiments, the motion sensing device can be provided by a 9-DOF (degree of freedom) motion sensing unit containing a 3-axis accelerometer, a 3-axis magnetometer, and 3-axis gyroscope sensors.

In a further aspect, motion sensing device 390a can be incorporated into the mobile computing device. Alternatively, motion sensing device 390b can be provided by an external device, such as an onboard speedometer installed on a motor vehicle 900, in communication with the mobile computing device via a wired or wireless communication interface.

Figure 2:
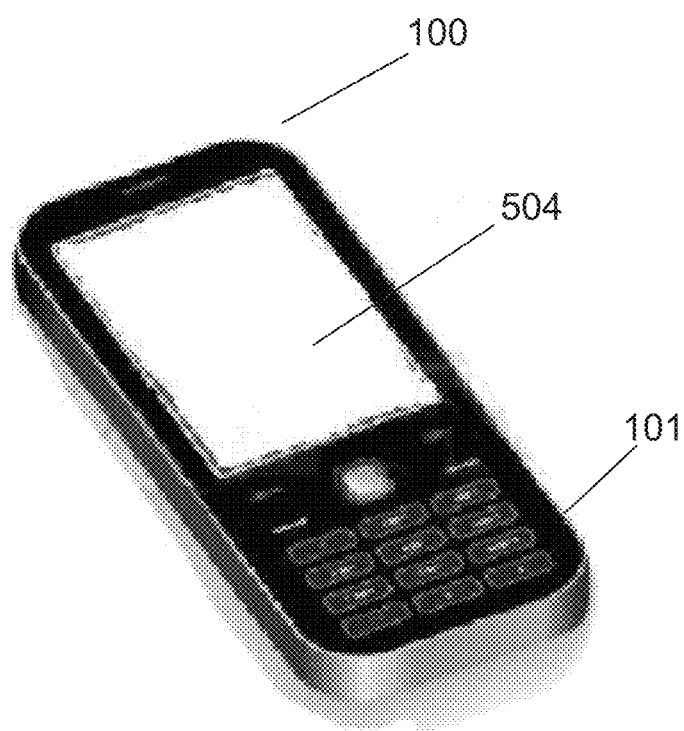
FIG. 2 schematically illustrates a mobile computing device.

The components of mobile computing device 100 can be incorporated into a variety of different housings of various forms factors. In one embodiment, schematically shown in FIG. 2, mobile computing device 100 can be provided by a smartphone. Smartphone 100 can comprise a hand held housing 101 and a display 504 having an associated touch screen overlay. A skilled artisan would appreciate the fact that other housings and form factors of mobile computing device 100 are within the scope of this disclosure.

As noted herein supra, a specialized communication port driver can be installed on the mobile computing device to support communications of the navigation software program with the communication port to which the navigational signal receiver is connected. The communication port driver can combine the outputs of the navigational signal receiver and at least one motion sensing device (such as a speedometer or an accelerometer).

In one illustrative embodiment, the communication port driver can operate in interrupt-driven mode of operation. The communication port driver can intercept the hardware interrupts generated by the communication port to which the navigational signal receiver is attached. In a further aspect, a hardware interrupt can be generated by the communication port when one or more bytes transmitted by the navigational signal receiver are available in the input buffer of the communication port. Another type of a software interrupt can be generated by the communication port when the output buffer of the communication port is ready to receive one or more bytes to be transmitted.

Alternatively, in the polling mode of operation, the communication port driver can periodically poll one or more status signals (e.g., DSR/DTR signals) indicating the presence of one or more bytes in the input buffer of the communication port. For transmitting one or more bytes, the communication port driver can assert the Request-to-Send (RTS) signal and then periodically poll the status of the Clear-to-Send (CTS) signal indicating that one or more bytes can be placed into the output buffer of the communication port.

In either interrupt-driven or polling mode of operation, the communication port driver can maintain an input queue holding one or more bytes received from the navigational signal receiver and an output queue holding one or more bytes to be sent to the navigational signal receiver.

As noted herein supra, in addition to communicating with the navigational signal receiver, the communication port driver can communicate with at least one motion sensing device (for example, a speedometer or an accelerometer). In some embodiments, at least one motion sensing device can be incorporated into the mobile communication device, and can be communicatively coupled to the system bus 370 via an interface circuit. Alternatively, the mobile communication device can communicate with at least one external motion sensing device (e.g., a motor vehicle speedometer, or an onboard accelerometer) via a second communication port.

Figure 3A:
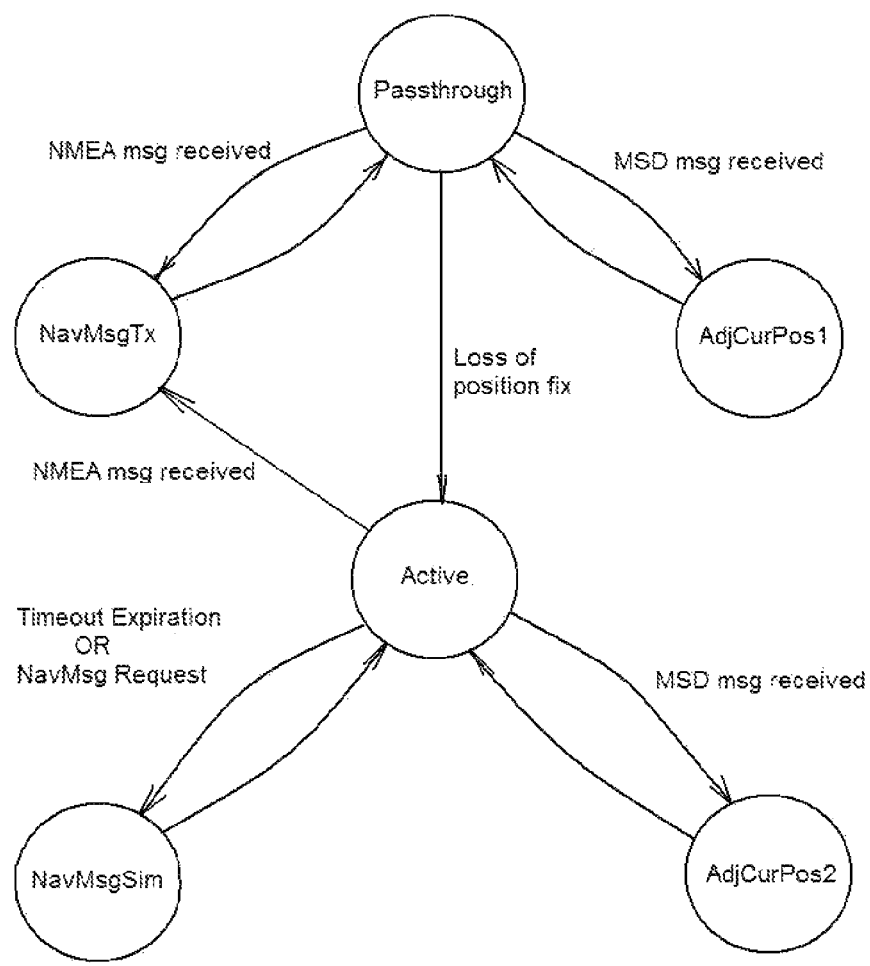
FIGS. 3a-3b schematically illustrate various embodiments of the state machines implemented by the communication port driver described herein.

In a further aspect, the driver of the communication port to which the navigational signal receiver is connected can be configured to implement a state machine schematically shown in FIG. 3*a*.

Upon initialization, the communication port driver can transition to the Pass-through state and wait until a message is received from the navigational signal receiver or from at least one motion sensing device (for example, a speedometer, or an accelerometer). As noted herein supra, in some embodiments, the messages sent by the navigational signal receiver can comply with NMEA 0183 standard. A skilled artisan would appreciate the fact that other navigational message standards and formats are within the scope of this disclosure.

Responsive to receiving, while being in the Pass-Through state, a message containing valid geographic coordinates from the navigational signal receiver, the communication port driver can transition to the NavMsgTx state. Upon storing in the memory the current spatial position represented by the geographic coordinates and forwarding the message containing the geographic coordinates to the navigation program, the communication port driver can return to the Pass-Through state.

Responsive to receiving, while being in the Pass-Through state, a message containing motion sensing data from a motion sensing device, the communication port driver can transition to the AdjCurPos1 state. Upon adjusting, based on the motion sensing data, the current spatial position stored in the memory, the communication port driver can return to the Pass-Through state.

Responsive to receiving, while being in the Pass-Through state, a message indicating loss of valid position fix from the navigational signal receiver, the communication port driver can transition to the Active state.

Responsive to receiving, while being in the Active state, a message containing motion sensing data from a motion sensing device, the communication port driver can transition to the AdjCurPos2 state. Upon adjusting, based on the motion sensing data, the current spatial position stored in the memory, the communication port driver can return to the Active state.

Responsive to receiving, while being in the Active state, a message from the system timer indicating a timeout expiration or a message from the navigation program requesting the current geographic coordinates, the communication port driver can transition into the NavMsgSim1 state. Upon constructing a simulated navigational information message (e.g., a NMEA message) containing the geographic coordinates of the stored current spatial position, the communication port driver can return to the Active state.

Responsive to receiving, while being in the Active state, a message containing valid geographic coordinates from the navigational signal receiver, the communication port driver can transition to the NavMsgTx state. Upon storing in the memory the current spatial position represented by the geographic coordinates and forwarding the message containing the geographic coordinates to the navigation program, the communication port driver can transition to the Pass-Through state.

Figure 3B:
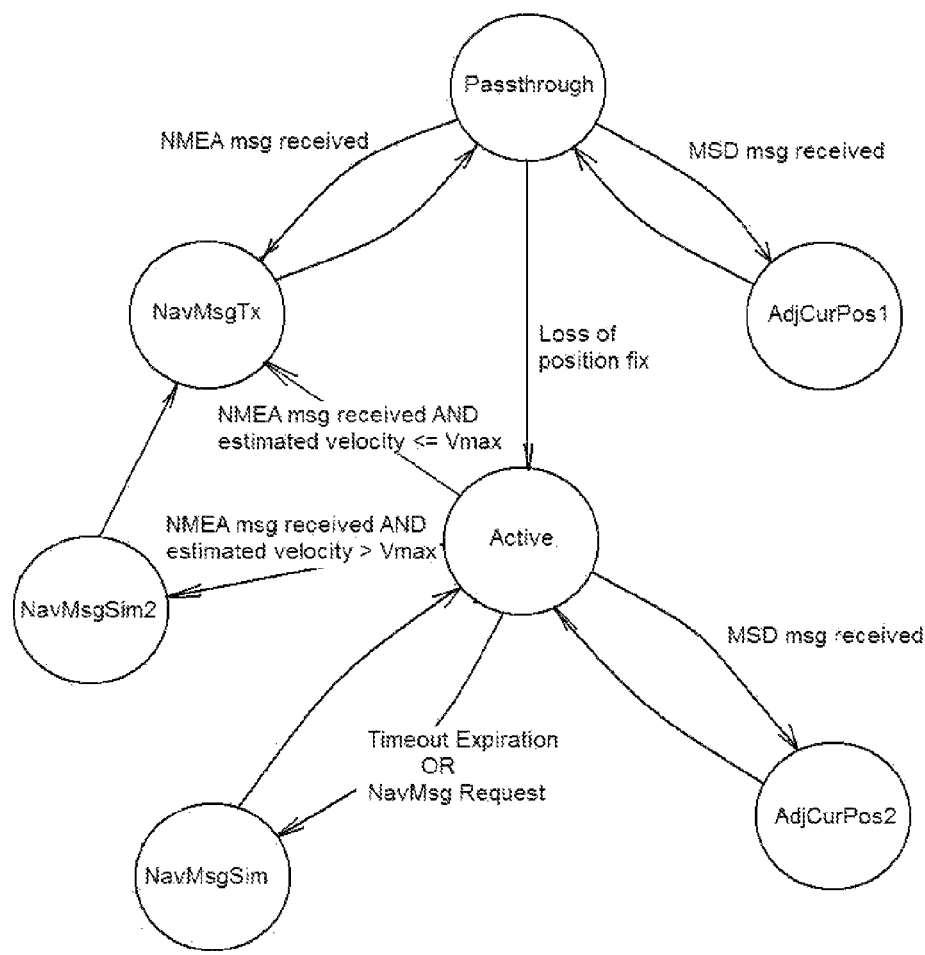

In another illustrative embodiment, schematically shown in FIG. 3*b*, the communication port driver operating in the Active state can, responsive to receiving a message containing valid geographic coordinates from the navigational signal receiver, analyze the difference between the approximated spatial position calculated based on the motion sensing data and the current spatial position reported by the navigational signal receiver, to ascertain that the apparent velocity calculated based on two subsequent messages transmitted by the communication port driver to the navigation program would not exceed a pre-defined threshold velocity, due to possible errors introduced by calculating the current position based on the motion sensing data in the absence of valid coordinate readings from the navigational signal receiver. The apparent velocity can be calculated as the distance between the current spatial position reported by the navigational signal receiver and the last approximated spatial position calculated based on the motion sensing data, divided by the time elapsed since the message containing the last spatial position calculated based on the motion sensing data has been transmitted by the communication port driver to the navigation program. Hence, responsive to receiving, while being in the Active state, a message containing valid geographic coordinates from the navigational signal receiver, the communication port driver can transition to the NavMsgTx state if the apparent velocity is less than a pre-defined threshold value; otherwise, the communication port driver can transition to the NavMsgSim2 state.

The communication port driver operating in the NavMsgSim2 state can transmit to the navigation program a simulated navigational information message (e.g., a NMEA message) containing the geographic coordinates of a point found on the trajectory between the last spatial position reported by the communication port driver to the navigation program and the current spatial position reported by the navigational signal receiver. The distance between the previously reported and the current position can be calculated based on the pre-defined maximum velocity value. The communication port driver can remain in the NavMsgSim2 state and transmit two or more simulated messages, until the simulated position reaches the actual current position, at which point the communication port driver can transition to NavMsgTx state.

A sample of systems and methods that are described herein follows:

A1. A navigation system comprising: a microprocessor; a memory; a navigational signal receiver communicatively coupled to said microprocessor via a communication port, said navigational signal receiver configured to receive a radio signal from at least one external system; a motion sensing device; a communication port driver in communication with said communication port; a navigation program executable by said microprocessor, said navigation program configured to receive messages from said navigational signal receiver by communicating to said communication port driver; wherein said communication port driver is configured to operate in a first operating mode and a second operating mode; wherein said communication port driver operating in said first operating mode is configured, responsive to receiving from said navigational signal receiver a first message comprising valid geographic coordinates, to store a current spatial position in said memory and forward said first message to said navigation program; wherein said communication port driver operating in either said first operating mode or said second operating mode is configured to adjust, based on motion data received from said motion sensing device, said current spatial position stored in said memory; wherein said communication port driver operating in said first operating mode is configured, responsive to receiving from said navigational signal receiver a second message indicating a failed attempt to obtain valid geographic coordinates, to switch to said second operating mode; wherein said communication port driver operating in said second operating mode is configured to transmit a third message to said navigation program, said third message comprising geographic coordinates calculated based on said current spatial position stored in said memory; and wherein said first message, said second message, and said third message comply to a pre-defined navigation message standard. A2. The navigation system of (A1), wherein said external system is provided by a satellite-based navigation system. A3. The navigation system of (A2), wherein said satellite-based navigation system is selected from the group consisting of: Global Positioning System (GPS), Global Navigation Satellite System (GLONASS). A4. The navigation system of (A1), wherein said system is provided by a mobile computing device. A5. The navigation system of (A1), wherein said system is provided by a mobile computing device selected from the group consisting of: a smart phone and a portable computer. A6. The navigation system of (A1), wherein said system is provided by a mobile computing device communicatively coupled to an external motion sensing device. A7. The navigation system of (A6), wherein said external motion sensing device is communicatively coupled to said mobile computing device via at least one of: a wired communication interface and a wireless communication interface. A8. The navigation system of (A1), wherein said motion sensing device is provided by at least three accelerometers configured to measure proper acceleration values along at least three mutually-perpendicular axes. A9. The navigation system of (A1), wherein said motion sensing device is provided by a 9-DOF (degree of freedom) motion sensing unit containing a 3-axis accelerometer, a 3-axis magnetometer, and 3-axis gyroscope sensors. A10. The navigation system of (A1), wherein said motion sensing device is provided by a speedometer. A11. The navigation system of (A1), wherein said communication port is provided by one of: a serial communication port, a parallel communication port. A12. The navigation system of (A1), wherein said pre-defined navigation message standard is provided by NMEA 0183 standard. A13. The navigation system of (A1), wherein said communication port driver is configured to transmit said first message and said third message responsive to receiving a request from said navigation program. A14. The navigation system of (A1), wherein said communication port driver is configured to calibrate said motion sensing device based on said valid geographic coordinates received from said navigational signal receiver.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A navigation system comprising:
   a microprocessor;
   a memory;
   a navigational signal receiver communicatively coupled to said microprocessor via a communication port, said navigational signal receiver configured to receive a radio signal from at least one external system;
   a motion sensing device;
   a communication port driver in communication with said communication port;
   a navigation program executable by said microprocessor, said navigation program configured to receive messages from said navigational signal receiver by communicating with said communication port driver;
   wherein said communication port driver is configured to operate in a first operating state and a second operating state;
   wherein said communication port driver operating in said first operating state is configured, responsive to receiving from said navigational signal receiver a first message comprising valid geographic coordinates, to store a current spatial position in said memory and forward said first message to said navigation program;
   wherein said communication port driver operating in either said first operating state or said second operating state is configured to adjust, based on motion data received from said motion sensing device, said current spatial position stored in said memory;
   wherein said communication port driver operating in said first operating state is configured, responsive to receiving from said navigational signal receiver a second message indicating a failed attempt to obtain valid geographic coordinates, to switch to said second operating state;
   wherein said communication port driver operating in said second operating state is configured to simulate geographic coordinates calculated based on said current spatial position stored in said memory and remain in said second state until receiving valid geographic coordinates from said navigational signal receiver and then returning to said first operating state; and
   wherein said first message and said second message comply to a pre-defined navigation message standard.

2. The navigation system of claim 1, wherein said external system is provided by a satellite-based navigation system.

3. The navigation system of claim 2, wherein said satellite-based navigation system is selected from the group consisting of: Global Positioning System (GPS), Global Navigation Satellite System (GLONASS).

4. The navigation system of claim 1, wherein said system is provided by a mobile computing device.

5. The navigation system of claim 1, wherein said system is provided by a mobile computing device selected from the group consisting of: a smart phone and a portable computer.

6. The navigation system of claim 1, wherein said system is provided by a mobile computing device communicatively coupled to an external motion sensing device.

7. The navigation system of claim 6, wherein said external motion sensing device is communicatively coupled to said mobile computing device via at least one of: a wired communication interface and a wireless communication interface.

8. The navigation system of claim 1, wherein said motion sensing device is provided by at least three accelerometers configured to measure proper acceleration values along at least three mutually-perpendicular axes.

9. The navigation system of claim 1, wherein said motion sensing device is provided by a 9-DOF (degree of freedom) motion sensing unit containing a 3-axis accelerometer, a 3-axis magnetometer, and 3-axis gyroscope sensors.

10. The navigation system of claim 1, wherein said motion sensing device is provided by a speedometer.

11. The navigation system of claim 1, wherein said communication port is provided by one of: a serial communication port, a parallel communication port.

12. The navigation system of claim 1, wherein said communication port driver is configured to transmit said first message and said third message responsive to receiving a request from said navigation program.

13. The navigation system of claim 1, wherein said communication port driver is configured to calibrate said motion sensing device based on said valid geographic coordinates received from said navigational signal receiver.

14. A navigation system comprising:
a microprocessor;
a motion sensing device generating motion sensing data;
a navigational signal receiver communicatively coupled to said microprocessor via a communication port, said navigational signal receiver configured to receive a radio signal comprising geographical coordinates from at least one external system;
a memory storing said geographical coordinates received by said navigational signal receiver;
a communication port driver in communication with said communication port;
a navigation program executable by said microprocessor, said navigation program configured to receive messages from said navigational signal receiver by communicating with said communication port driver;
wherein, upon a failure to receive valid geographical coordinates from said external system, said communication port driver is configured to simulate geographical coordinates for an approximated spatial position calculated based on said geographic coordinates stored in said memory and said motion sensing data, and wherein said communication port driver stores a predefined threshold velocity, said predefined threshold velocity used by said microprocessor in determining validity of geographical coordinates received from said external system after said failure to receive.

15. A navigation system according to claim 14, wherein said communication port driver analyzes the difference between an approximated spatial position calculated based on the motion sensing data and a current spatial position indicated by said geographical coordinates received from said external system after said failure to receive.

16. A navigation system according to claim 15, wherein said difference is an apparent velocity.

17. A navigation system according to claim 16, wherein the system compares said apparent velocity to said threshold velocity.

18. A navigation system according to claim 17, wherein geographic coordinates corresponding to an apparent velocity less than said threshold velocity are transmitted to said navigation program and for geographic coordinates corresponding to apparent velocities greater than said threshold velocity, the system transmits intermediate geographic coordinates for a simulated position.

19. A navigation system comprising:
a microprocessor;
a motion sensing device generating motion sensing data;
a navigational signal receiver communicatively coupled to said microprocessor via a communication port, said navigational signal receiver configured to receive a radio signal comprising geographical coordinates from at least one external system;
a memory storing said geographic coordinates received by said navigational signal receiver;
a communication port driver in communication with said communication port;
a navigation program executable by said microprocessor, said navigation program configured to receive messages from said navigational signal receiver by communicating with said communication port driver; and
wherein, upon a failure to receive valid geographical coordinates from said external system, said communication port driver is configured to simulate geographical coordinates for an approximated spatial position calculated based on said geographic coordinates stored in said memory and said motion sensing data, and wherein said communication port driver stores a predefined threshold velocity, said predefined threshold velocity determining validity of geographical coordinates received from said external system after said failure to receive; and
wherein said communication port driver analyzes the difference between said approximated spatial position and a current spatial position indicated by said geographical coordinates received from said external system after said failure to receive;
wherein said communication port driver calculates an apparent velocity for comparison to said threshold velocity; and wherein geographic coordinates corresponding to an apparent velocity less than said threshold velocity are transmitted to said navigation program; and
wherein, for geographic coordinates corresponding to apparent velocities greater than said threshold velocity, the system transmits intermediate geographic coordinates for a simulated position.

* * * * *